(12) United States Patent
Strunck et al.

(10) Patent No.: US 6,216,882 B1
(45) Date of Patent: Apr. 17, 2001

(54) RETRACTABLE BICYCLE RACK

(76) Inventors: Jane Strunck; Theodore F. Strunck, both of 727 Golf, Royal Oak, MI (US) 48073; Patrick G. Burns, 725 Birch Rd., Lake Bluff, IL (US) 60044

( * ) Notice: Subject to any disclaimer, the term of this patent is extended or adjusted under 35 U.S.C. 154(b) by 0 days.

(21) Appl. No.: 09/417,176

(22) Filed: Oct. 12, 1999

Related U.S. Application Data

(63) Continuation of application No. 09/138,419, filed on Aug. 24, 1998, now abandoned.

(51) Int. Cl.$^7$ .......................................... A47F 7/00
(52) U.S. Cl. ................... 211/18; 211/19; 211/21; 211/96; 211/104
(58) Field of Search .................. 211/18, 19, 21, 211/22, 17, 104, 96, 89.01

(56) References Cited

U.S. PATENT DOCUMENTS

| | | |
|---|---|---|
| 1,745,402 | 2/1930 | Bülck . |
| 3,883,002 | 5/1975 | Moore ................................. 211/18 |
| 4,033,459 | 7/1977 | Zach .................................. 211/20 |
| 5,477,971 | 12/1995 | Howard ............................. 211/187 |
| 5,749,474 | 5/1998 | Woodcock ......................... 211/18 |
| 6,053,337 | * 4/2000 | Venegas ............................ 211/22 |

FOREIGN PATENT DOCUMENTS 3045769   9/1982   (DE) .

OTHER PUBLICATIONS

Graber Parking Systems Catalog Sheets; Wave Series, Oct. 1999.*

* cited by examiner

*Primary Examiner*—Robert W. Gibson, Jr.
(74) *Attorney, Agent, or Firm*—Greer, Burns & Crain, Ltd.

(57) ABSTRACT

A bicycle rack includes an inner vertical bar and an outer vertical bar secured in generally parallel relation by one or more horizontal supports. At least one horizontal support is secured at one end to at least one wall support so that the vertical bars are spaced from the wall support, with the inner vertical bar closest to the wall. When the wall support is secured to a wall, the rack is set at an angle with respect to the wall by a retaining rod. One end of the retaining rod is connected to the rack, and the other end is connected to the wall. The bicycle rack is preferably rotatably connected to the wall support so the rack can swivel about the wall support. Also, at least one end of the retaining rod can be easily removed, so the rack can be retracted when not in use, without removing it from the wall.

25 Claims, 3 Drawing Sheets

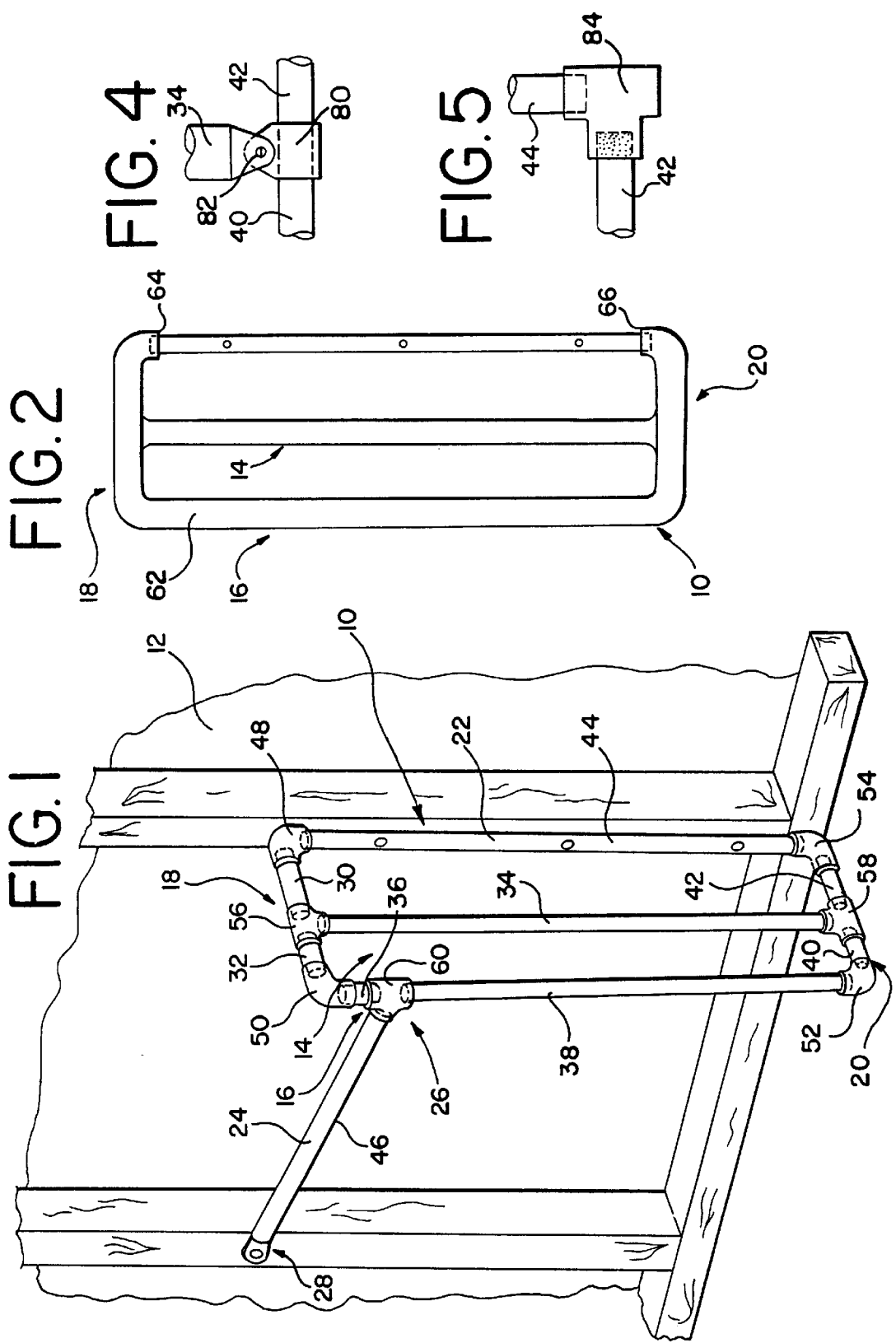

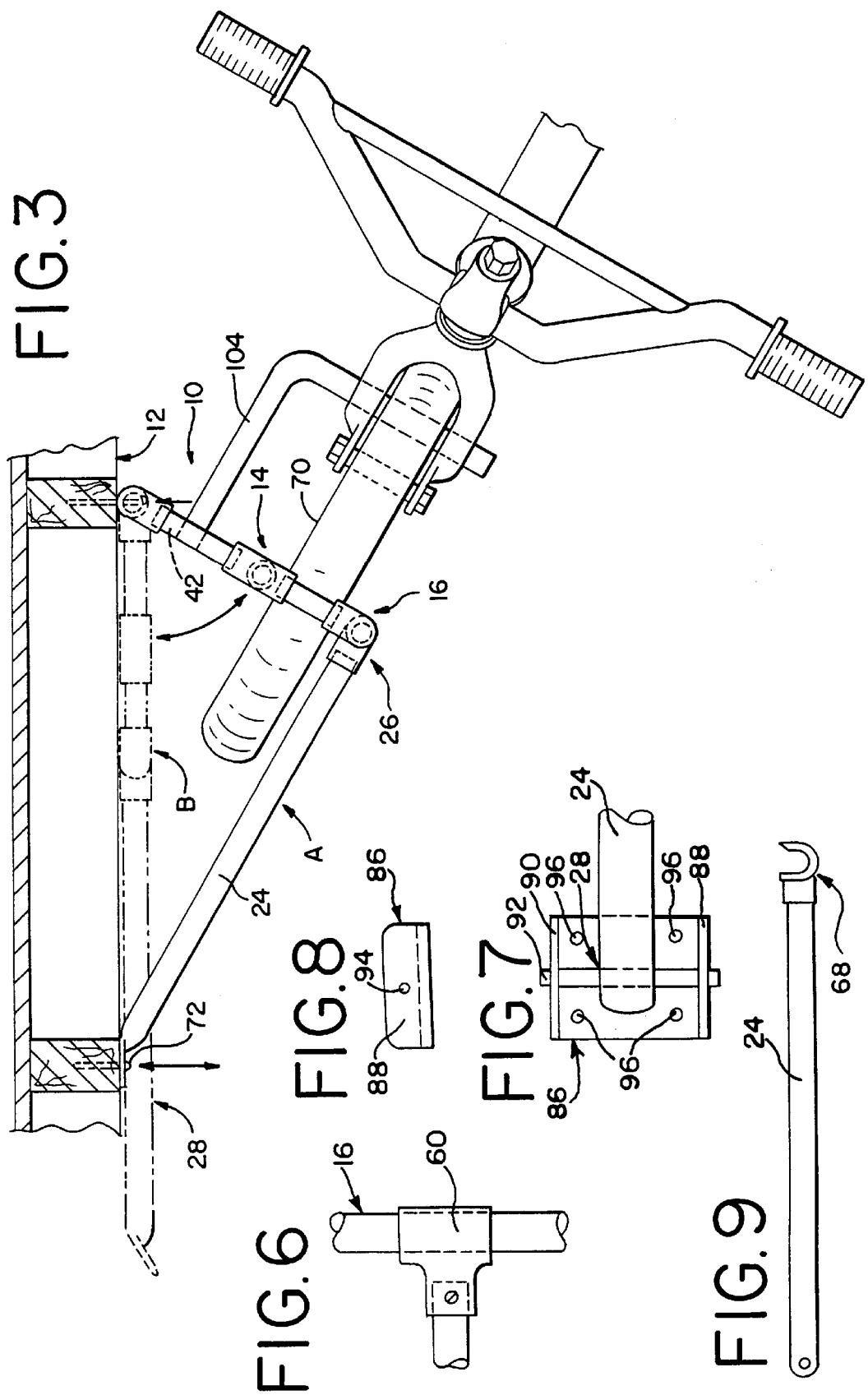

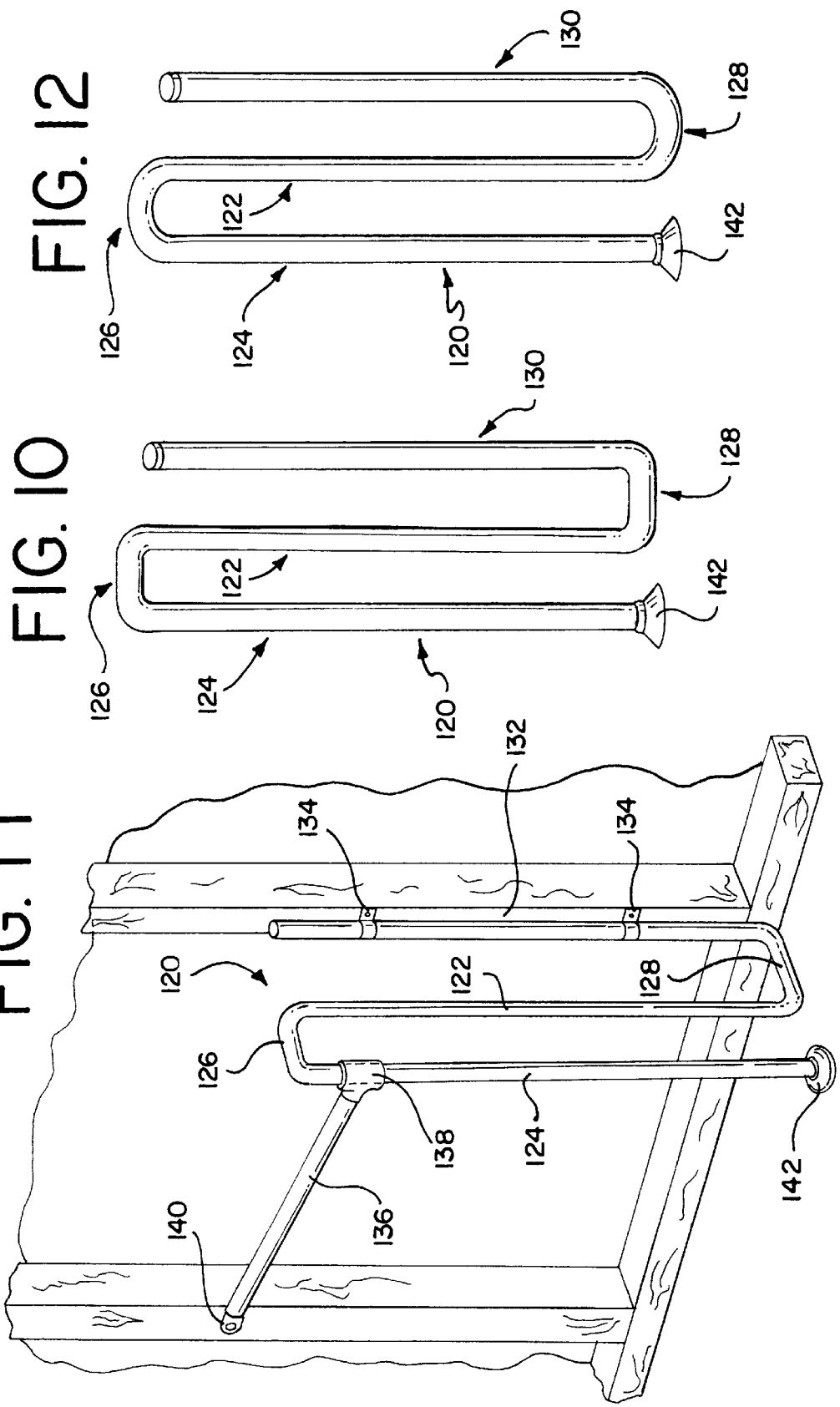

RETRACTABLE BICYCLE RACK

This is a continuation-in-part of Ser. No. 09/138,419, filed Aug. 24, 1998, now abandoned.

This invention relates to bicycle racks, and more particularly, to bicycle racks which can be conveniently attached to a wall and retracted when not in use.

BACKGROUND OF THE INVENTION

Bicycles are often parked in a home garage. They can be hung on a garage wall or from the ceiling to keep floor space open, but that is somewhat inconvenient, particularly for children. For this reason, it is preferable to leave a bicycle on the garage floor.

Kickstands are usually used to park a bicycle on the garage floor, but the bicycle can easily fall over. A falling bicycle can knock over other bicycles, and can fall on autos and other things, causing damage. Also, a parked bicycle can be disturbed when someone moves another bicycle between a car and the parked bicycle. Thus, there is a need for improved apparatus for storing a bicycle on a garage floor.

Bicycle racks are used to store bicycles in school yards, parks and other places. Bicycle racks conveniently support several bicycles, but they are not suitable for home garages because there is not enough space for them, particularly along the sides of a car, and the bicycles cannot be parked generally parallel to the garage wall. Thus, there is a need for bicycle racks which can be used in narrow spaces such as the area between the inside wall of a garage and a parked automobile. There is also a need for bicycle racks which allow a bicycle to be parked generally parallel to the wall.

Bicycles are often stored during cold winter months, and of course a garage floor must be cleaned from time to time. A conventional bicycle rack in a garage would obstruct the open floor space in the garage, even when the bicycles were stored. Such a bicycle rack would also interfere with cleaning the garage. Thus, there is also a need for bicycle racks which can be retracted when not in use, to create open floor space for other purposes, and for easy cleaning of the garage floor.

Accordingly, one object of this invention is to provide new and improved apparatus for storing bicycles in garages and the like.

Another object is to provide new and improved bicycle racks.

Still another object is to provide new and improved bicycle racks which can be conveniently attached to a wall in a garage or the like.

A further object is to provide new and improved bicycle racks which allow a bicycle to be parked on a floor more parallel than perpendicular to an adjacent wall, if desired.

Yet another object is to provide new and improved bicycle racks which can be retracted when not in use.

SUMMARY OF THE INVENTION

In keeping with one aspect of the invention, a bicycle rack includes an inner vertical bar and an outer vertical bar arranged in generally parallel relation to each other by at least one horizontal support. The horizontal support is secured at one end to at least one wall support. The vertical bars are secured by the same or another horizontal support so that they are spaced from the wall support.

The wall support is fastened to a garage wall, and is preferably set at an angle with respect to the wall by a retaining rod. One end of the retaining rod is connected to the rack, and the other end is connected to the wall.

The horizontal support is preferably rotatably connected to the wall support, and the retaining rod is removably connected at one or both ends. When the rack is not in use, the retaining rod can be disconnected at at least one end, and the rack rotated so that it lies against the wall, without removing it from the wall.

BRIEF DESCRIPTION OF THE DRAWINGS

These and other aspects of the invention will be better understood by reference to the following description of the invention in conjunction with the drawings, in which:

FIG. 1 is a perspective view of a rack made in accordance with the principles of this invention;

FIG. 2 is a front view of an alternate embodiment of the rack of FIG. 1;

FIG. 3 is a top view of a rack made in accordance with the principles of the invention, shown with a bicycle in the rack;

FIG. 4 is a front view of an alternate embodiment of a lower leg connection for the rack shown in FIG. 1;

FIG. 5 is a front view of an alternate embodiment of a leg connection for the rack shown in FIG. 1;

FIG. 6 is a front view of an alternate embodiment of a retractable arm connection for the rack shown in FIG. 1;

FIG. 7 is a front view of an alternate embodiment of a retractable arm connection for the rack shown in FIG. 1;

FIG. 8 is a top view of the retractable arm connection shown in FIG. 7;

FIG. 9 is a front view of an alternate embodiment of the retractable arm in the rack shown in FIG. 1;

FIG. 10 is a front view of another alternate embodiment of the bicycle rack shown in FIG. 1;

FIG. 11 is a perspective view of the rack shown in FIG. 10; and

FIG. 12 is a front view of an alternate embodiment of the bicycle rack shown in FIG. 10.

DETAILED DESCRIPTION

As seen in FIG. 1, a bicycle rack 10 is secured to a wall or other supporting surface 12. The surface 12 could be a stud, or a board secured to some studs. However, it is preferably vertical.

The rack 10 includes an inner vertical bar 14 and an outer vertical bar 16 arranged in generally parallel relation by an upper horizontal support 18 and a lower horizontal support 20. A parallel relationship is generally preferred, but the supports can also be located closer together at the top than the bottom, to more securely hold the upper part of a bicycle wheel, if desired.

The upper and lower horizontal supports 18, 20 are secured at one end to at least one wall support 22, and the wall support 22 is secured to the wall 12. When the wall support 22 is secured to the wall 12, the vertical bars 14 and 16 are spaced from the wall 12 with the inner vertical bar 14 closest to the wall 12.

When the wall support 22 is secured to the wall 12, the rack 10 is preferably set at an angle with respect to the wall 12 and secured at that angle by a retaining rod 24. One end 26 of the retaining rod 24 is connected to the rack 10, and another end 28 is connected to the wall 12.

The rack 10 can be made of metal or plastic such as PVC, and it can be made in various combinations of pieces. The rack as shown in FIG. 1 is made of several straight pieces of pipe 30, 32, 34, 36, 38, 40, 42, 44 and 46, L-shaped connectors 48, 50, 52 and 54, and T-shaped connectors 56, 58 and 60 assembled as shown in FIG. 1. The pieces could be secured by adhesive, screws or in any other suitable way, although the piece 44 is preferably not permanently fixed to the L-shaped pieces 48, 54.

The rack shown in FIG. 2 has a single piece of tube 62 bent to the appropriate shape, and the inner vertical bar 14 is welded or otherwise secured to the tube 62. The tube 62 forms the outer vertical bar 12, the upper horizontal support 18 and the lower horizontal support 20. Ends 64 and 66 are rotatably secured to the wall support 22, as will be described, and the retaining rod 24 (FIG. 9) is removably secured to the outer vertical bar 16 by a clip 68. The clip 68 could also be secured to the inner vertical bar 14, if desired.

The upper and lower horizontal supports 18, 20 are preferably rotatably connected to the wall support 22, and the retaining rod 24 is removably connected at the end 26 and/or end 28. In this manner, the rack 10 can be retracted when not in use, without removing it from the wall 12, as seen in FIG. 3.

In FIG. 3, the rack 10 is shown secured in position A for use, with a bicycle wheel 70 in the rack 10 between the vertical bars 14 and 16. Of course, the bicycle frame can be rotated to be more parallel to the wall than perpendicular, to fit into the narrow space between a vehicle and a garage wall in a typical garage. The angle A and bicycle frame could also be arranged to place the bicycle perpendicular to the wall, if preferred.

The retaining rod 24 is secured at the end 28 by a screw 72. When the screw 72 is removed, the retaining rod may be rotated at the end 26 and the rack 10 may be placed against the wall 12, shown as position B in FIG. 3.

The rack 10 may be fabricated and assembled in many other ways. For example, the T-shaped connectors 56, 58 may be replaced with a clamp 80 secured to a support 34 by a screw 82, as in FIG. 4. With this configuration, the vertical rod 34 can be adjusted for different size bicycles.

A T-shaped connector 84 can be used in place of the L-shaped pieces 52 and 54 to raise the rack 10 off of the ground slightly, as in FIG. 5. This allows the floor to be cleaned more easily with the rack in place, and in some cases provides a better abutment for the bottom of the bicycle wheel.

The retaining rod 24 can also be secured in many suitable ways in addition to the way shown in FIGS. 1, 2 and 9. In FIG. 6, the vertical rod 16 is a single piece of material and the T-shaped connector 60 is a sleeve which fits over the rod 16, instead of the two-piece construction shown in FIG. 1. The end 28 can be secured to the wall with a bracket 86, as in FIGS. 7 and 8. The bracket 86 includes two side walls 88, 90, and a pin 92 which fits through the end 28 of the rod 24 and openings 94 in the side walls 88, 90. The bracket 86 is secured to the wall by fasteners placed through openings 96.

Another alternate embodiment of the invention is shown in FIGS. 10 and 11. A bicycle rack 120 has an inner vertical bar 122 and an outer vertical bar 124 arranged in generally parallel relation by an upper horizontal support 126 and a lower horizontal support 128. A vertical wall support 130 is provided for securing the rack 120 to a wall 132, as shown in FIG. 11. The vertical wall support 130 could be fixed to the wall 132, or it can be rotatably secured by brackets 134. A footpad 142 may be provided for the lower end of the outer vertical bar 124, if desired.

One of the vertical bars 122, 124, preferably the vertical bar 124, has a retaining rod 136 secured to it by a T-connector 138, or any other suitable structure. The retaining rod 136 is secured to the T-connector 138 by a screw, a weld, or any other suitable means, and is secured at its other end to the wall 132 by a screw 140 or the like.

The horizontal supports 126, 128 can be fairly straight, as shown in FIGS. 10 and 11, or they can be curved, as in FIG. 12. A one-piece construction is shown in the drawings, although the rack 124 could be constructed from multiple pieces, in the manner previously described. Also, the rack 124 could be turned upside-down and secured to the wall 132, if desired.

The embodiments of FIGS. 1 and 2 include upper and lower horizontal supports which both extend from the outer vertical bar to the wall support, and the embodiment of FIGS. 10 and 11 includes an upper horizontal support which arranges the inner and outer vertical bars in a generally parallel relationship, and a lower horizontal support which spaces the inner vertical bar from the wall support. It is also contemplated that a single upper horizontal support could be provided to arrange the inner and outer vertical bars and space them from the wall, or a single lower horizontal support could be provided for the same purpose.

The distance between the bars 14, 16 and 122, 124 is set so that when the bicycle wheel 70 is placed between them, it does not move excessively from side to side, maintaining the bicycle in a stable condition. At the same time, the bars 14, 16 and 122, 124 are spaced far enough apart so that a significant portion of the wheel is between the bars, without damaging spokes 98. The preferred distance between the bars may vary somewhat, depending on the size of the bicycle, tire size and type, and so forth, but the distance will be such that about half of the distance C between the wheel axle 100 and the forwardmost point 102 of the wheel 70 fits comfortably between the bars.

Most bicycles will be adequately held in the racks 10 and 120. If desired, however, a supplemental wheel support 104 can be provided, to more affirmatively secure the bicycle in the rack, as seen in FIG. 3. The support 104 is secured to the lower horizontal support 42, and extends behind the wheel 70 of the bicycle.

In use, the racks 10 and 120 are secured to the wall at a convenient angle, as in FIGS. 1 and 11, although the angle may be changed slightly for different bicycles and different garage configurations. In any event, the rack can be secured to drywall or plaster, garage wall studs, with or without drywall, or any other suitable surface. If the bicycle is stored, the rack can be easily placed against the wall by removing or releasing the retaining rod, as described.

The many advantages of the invention are now apparent. Bicycles can be conveniently stored between an auto and a wall in a garages or the like, where space is limited. In addition, the bicycle rack can be retracted when not in use.

While the principles of the invention have been described above in connection with specific apparatus and applications, it is to be understood that this description is made only by way of example and not as a limitation on the scope of the claims.

We claim:

1. A bicycle rack which can be secured to a vertical surface comprising:

an inner vertical bar and an outer vertical bar secured in generally parallel relation by an upper horizontal support and a lower horizontal support, said upper and lower horizontal supports being capable of being secured to the vertical surface so that said vertical bars are spaced from the vertical surface, wherein said inner and outer vertical bars are capable of being secured at an angle with respect to the vertical surface by a retaining rod having two ends, one end of said retaining rod being connected to the rack, and the other end of said retaining rod being connected to the vertical surface.

2. The bicycle rack of claim 1 wherein:

said upper and lower horizontal supports are rotatably connected to the vertical surface, and said retaining rod is removably connected at at least one of said ends, whereby the rack can be retracted against the vertical surface when not in use, without removing it from the vertical surface.

3. The bicycle rack of claim 1 wherein:

said other end of said retaining rod is connected to the vertical surface by a bracket, said bracket having two side walls and a pin which fits through said other end of said retaining rod and openings in said side walls.

4. The bicycle rack of claim 1 wherein:

said inner and outer vertical bars are closer together at the top than at the bottom.

5. The bicycle rack of claim 1 wherein said inner and outer vertical bars form a plane, said inner and outer vertical bars being secured to the vertical surface such that said plane is at an angle with respect to vertical surface.

6. The bicycle rack of claim 1 comprising a wheel support secured to said lower horizontal support.

7. The bicycle rack of claim 1 wherein said outer vertical bar, said upper horizontal support and said lower horizontal support are formed of a tube and said inner vertical bar is secured to said tube.

8. A bicycle rack which can be secured to a vertical surface comprising:

an inner vertical bar and an outer vertical bar secured in generally parallel relation by an upper horizontal support and a lower horizontal support, said upper and lower horizontal supports being capable of being secured to the vertical surface so that said vertical bars are spaced from the vertical surface, wherein said upper and lower horizontal supports are rotatably connected to the vertical surface, and a retaining rod having at least two ends is connected to the rack on one end and the vertical surface on another end, said retaining rod being removably connected at at least one of said ends, whereby the rack can be retracted against the vertical surface when not in use, without removing it from the vertical surface.

9. The bicycle rack of claim 8 wherein said outer vertical bar, said upper horizontal support and said lower horizontal support are formed of a tube and said inner vertical bar is secured to said tube.

10. A bicycle rack which can be secured to a vertical surface comprising:

an inner vertical bar and an outer vertical bar arranged in generally parallel relation by one or more horizontal supports, at least one of said horizontal supports being capable of being secured with respect to the vertical surface so that said vertical bars are spaced from the vertical surface, wherein said inner and outer vertical bars are capable of being secured at an angle with respect to the vertical surface by a retaining rod having two ends, one end of said retaining rod being connected to the rack, and the other end of said retaining rod being connected to the vertical surface.

11. The bicycle rack of claim 10 wherein:

said at least one horizontal support is rotatably connected with respect to the vertical surface, and said retaining rod is removably connected at at least one of said ends, whereby the rack can be retracted against the vertical surface when not in use, without removing it from the vertical surface.

12. The bicycle rack of claim 10 wherein:

said other end of said retaining rod is connected to the vertical surface by a bracket, said bracket having two side walls and a pin which fits through said other end of said retaining rod and openings in said side walls.

13. The bicycle rack of claim 10 wherein:

said inner and outer vertical bars are closer together at the top than at the bottom.

14. The bicycle rack of claim 10 wherein said inner and outer vertical bars form a plane, said inner and outer vertical bars being secured to the vertical surface such that said plane is at an angle with respect to the vertical surface.

15. The bicycle rack of claim 10 comprising a wheel support secured to one of said horizontal supports.

16. The bicycle rack of claim 10 comprising a first horizontal support which secures said inner vertical bar in generally parallel relation with said outer vertical bar, and a second horizontal support which spaces said inner and said outer vertical bars from the vertical surface.

17. The bicycle rack of claim 16 wherein said first horizontal support is an upper horizontal support, and said second horizontal support is a lower horizontal support.

18. The bicycle rack of claim 16 wherein said first and second horizontal supports are curved.

19. The bicycle rack of claim 16 wherein said inner vertical bar, said outer vertical bar, said first horizontal support and said second horizontal support are formed of a single tube.

20. The bicycle rack of claim 19 wherein said tube comprises a wall support extending from said second horizontal support.

21. The bicycle rack of claim 16 comprising a wall support secured to said second horizontal support.

22. A bicycle rack which can be secured to a vertical surface comprising:

an inner vertical bar and an outer vertical bar arranged in generally parallel relation by one or more horizontal supports, at least one of said horizontal supports being capable of being secured with respect to the vertical surface so that said vertical bars are spaced from the vertical surface, wherein said horizontal support is rotatably connected to the vertical surface, and a retaining rod having at least two ends is connected to the rack on one end and the vertical surface on another end, said retaining rod being removably connected at at least one of said ends, whereby the rack can be retracted against the vertical surface when not in use, without removing it from the vertical surface.

23. The bicycle rack of claim 22 comprising a first horizontal support and a second horizontal support.

24. The bicycle rack of claim 23 wherein said inner vertical bar, said outer vertical bar, said first horizontal support and said second horizontal support are formed of a tube.

25. The bicycle rack of claim 24 wherein said first and second horizontal supports are curved.

* * * * *